US006176912B1

(12) United States Patent
Kato et al.

(10) Patent No.: US 6,176,912 B1
(45) Date of Patent: Jan. 23, 2001

(54) INK JET PRINTER AND INK FOR INK JET RECORDING

(75) Inventors: Kenichi Kato; Chiyoshige Nakazawa; Kazuhiko Sato; Hiroshi Mukai; Katsuko Aoki; Youichi Kubomura, all of Nagano (JP)

(73) Assignee: Seiko Epson Corporation, Tokyo (JP)

( * ) Notice: Under 35 U.S.C. 154(b), the term of this patent shall be extended for 0 days.

(21) Appl. No.: 09/337,499

(22) Filed: Jun. 22, 1999

Related U.S. Application Data

(62) Division of application No. 08/703,742, filed on Aug. 27, 1996, now Pat. No. 5,972,086.

(30) Foreign Application Priority Data

Aug. 28, 1995 (JP) .................................................. 7-219302
Aug. 5, 1996 (JP) .................................................. 8-206279

(51) Int. Cl.[7] .................................................. C09D 11/02
(52) U.S. Cl. .................................. 106/31.43; 106/31.49; 106/31.58; 106/31.59; 106/31.75; 106/31.78; 106/31.86; 106/31.89
(58) Field of Search ............................... 106/31.43, 31.49, 106/31.58, 31.59, 31.75, 31.78, 31.86, 31.89

(56) References Cited

U.S. PATENT DOCUMENTS

| 4,325,735 | 4/1982 | Ohta et al. ........................ 106/31.58 |
| 4,367,480 | * 1/1983 | Kotoh ...................................... 347/71 |
| 4,421,559 | 12/1983 | Owatari ................................. 106/20 |
| 4,957,553 | * 9/1990 | Koike et al. ....................... 106/31.58 |
| 5,127,947 | 7/1992 | Takimoto et al. ....................... 106/22 |
| 5,183,502 | 2/1993 | Meichsner et al. ............... 106/31.58 |
| 5,395,434 | * 3/1995 | Tochihara et al. ................ 106/31.58 |

FOREIGN PATENT DOCUMENTS

| 0 320 223 | 6/1989 | (EP) . | |
| 0 473 160 | 3/1992 | (EP) . | |
| 0 479 441 A2 | 4/1992 | (EP) | ............................... B41J/2/14 |
| 0 534 427 | 3/1993 | (EP) . | |
| 0 580 283 A2 | 1/1994 | (EP) | ............................... B41J/2/16 |
| 0 592 774 | 4/1994 | (EP) . | |
| 0 664 217 | 7/1995 | (EP) . | |
| 0 684 293 | 11/1995 | (EP) . | |
| 61-26596 | 6/1986 | (JP) | ............................... C09D/11/16 |
| 4-239067 | 8/1992 | (JP) | ............................... C09D/11/00 |

OTHER PUBLICATIONS

JP 59 098858, Patent Abstracts of Japan, vol. 008, No. 2106, Jun. 7, 1984.
JP 05 016353, Patent Abstracts of Japan, vol. 017, No. 286, Jan. 26, 1993.

* cited by examiner

Primary Examiner—Helene Klemanski
(74) Attorney, Agent, or Firm—Sughrue, Mion, Zinn, Macpeak & Seas, PLLC

(57) ABSTRACT

An ink jet printer is disclosed, which jets a water-soluble ink from a recording head comprising at least an ink passage-forming member and an orifice through the orifice to form flying droplets which form a dot image on a recording medium, wherein at least a portion of the ink passage-forming member is composed of borosilicate glass and the water-soluble ink comprises at least one of urea and thiourea. Further, an ink for use in the ink jet printer is also disclosed.

5 Claims, 4 Drawing Sheets

INK JET PRINTER AND INK FOR INK JET RECORDING

CROSS REFERENCE TO RELATED APPLICATIONS

This is a divisional of application Ser. No. 08/703,742 filed Aug. 27, 1996, now U.S. Pat. No. 5,972,086 the disclosure of which is incorporated herein by reference.

FIELD OF THE INVENTION

The present invention relates to an on-demand type ink jet printer which is mounted mainly on computer terminal, electronic calculator, cash register, ATM, facsimile, etc.

BACKGROUND OF THE INVENTION

The inventors have heretofore proposed a process for obtaining an ink jet head which comprises anodically connecting borosilicate glass to a silicon substrate having fine grooves formed thereon to form various ink passages thereon as disclosed in JP-A-6-23980 (The term "JP-A" as used herein means an "unexamined published Japanese patent application") and JP-A-6-31914. This process enables an easy production of a large amount of ink jet heads at a low-cost.

On the other hand, an aqueous ink for ink jet recording described in JP-A-2-255774 comprises water, a water-soluble dye, a drying inhibitor and a penetrant. As the penetrant there may be used one comprising a compound represented by the following general formula:

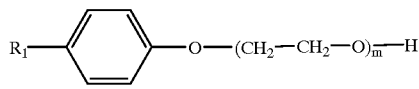

wherein $R_1$ represents a hydrogen atom, a methyl group, a methoxy group, a chlorine atom or a bromine atom; and m represents an integer of from 1 to 5 (hereinafter referred to as "compound (1)") and an ethylene oxide adduct of butyl alcohol wherein the number of moles of added ethylene oxide is from 1 to 5 (hereinafter referred to as "compound (2)"), and optionally a propylene oxide adduct of butyl alcohol wherein the number of moles of added propylene oxide is from 1 to 5 as a penetrant (hereinafter referred to as "compound (3)"), whereby the surface tension thereof is from 30 to 40 dyn. In this arrangement, the evaporation of water or the like from the ink through the nozzle of the recording head can be suppressed, inhibiting the rise of the viscosity of the ink and hence enabling normal ink jetting. Further, a highly stable ink jetting can be effected, enabling a good quality printing.

However, when a recording head made of borosilicate glass as described in JP-A-6-23980 and JP-A-6-31914 filled with a water-soluble ink for ink jet recording as described in JP-A-2-255774 is allowed to stand at high temperatures over an extended period of time, borosilicate glass in contact with the water-soluble ink elutes with the ink. When the water in the ink evaporates from the surface of the nozzle, the solution of borosilicate glass is supersaturated, causing borosilicate glass to be deposited on the surface of the nozzle. This causes the recording head to be clogged, disabling the jetting of ink droplets and hence causing a phenomenon of omission of recorded image, i.e., so-called dot failure. Further, if ink droplets are jetted leaving deposits of borosilicate glass in the nozzle, the ink shots can be malpositioned (a phenomenon in which an ink droplet cannot fly perpendicular to the recording medium), deteriorating the printing quality.

In order to solve these problems, a recording head molded from a plastic or metal may be used. With this arrangement, the substances constituting the ink passage don't elute and deposit. Thus, the evaporation of ink components such as water from the nozzle of the recording head can be suppressed, inhibiting the rise of the viscosity of the ink and hence enabling normal ink jetting. Further, stable jetting can be conducted, enabling a good quality printing.

However, the recording head molded from a plastic or metal requires a much production cost to reduce the nozzle diameter to a good precision. Thus, the resulting ink jet printer is very expensive. However, if the ink jet printer is used with the nozzle diameter left large, the ink discharge rate per dot is increased, making it extremely difficult to print at a high resolution and hence making it impossible to provide a high fineness and a high printing quality in printing.

As another method for inhibiting the deposition of borosilicate glass there may be used a method which comprises frequently restoring the nozzle (externally pressing and sucking off the ink from the nozzle to keep the viscosity of the ink constant). However, this method is disadvantageous in that a large amount of the ink must be consumed for the restoration of the nozzle. The method is also disadvantageous in that the wasteful consumption of the ink forces the user to frequently renew the ink jet cartridge. After all, this method presents an inconvenience to the user.

SUMMARY OF THE INVENTION

The present invention has been worked out to solve these problems.

That is, an object of the present invention is to provide an ink jet printer equipped with a recording head made of borosilicate glass which is filled with a water-soluble ink to effect printing and an ink for ink jet recording which are less susceptible to elution of borosilicate glass and hence prevent the nozzle from being clogged.

Another object of the present invention is to provide an ink jet printer which can operate at a less ink consumption, i.e., can print a larger amount of record per cartridge to reduce the frequency of renewal of the cartridge and hence present convenience to the user.

The ink jet printer according to the present invention is an ink jet printer which jets a water-soluble ink from a recording head comprising at least an ink passage-forming member and an orifice through the orifice to form flying droplets which form a dot image on a recording medium, wherein at least a portion of said ink passage-forming member is composed of borosilicate glass and said water-soluble ink comprises at least one of urea and thiourea.

Further, the ink for ink jet recording ink according to the present invention is an ink for ink jet recording for use in an ink jet printer which jets a water-soluble ink from a recording head comprising an ink passage-forming member which is at least partly formed by borosilicate glass and an orifice through the orifice to form flying droplets which form a dot image on a recording medium, wherein said ink comprises at least one of urea and thiourea.

DETAILED DESCRIPTION OF THE INVENTION

Figure 1:
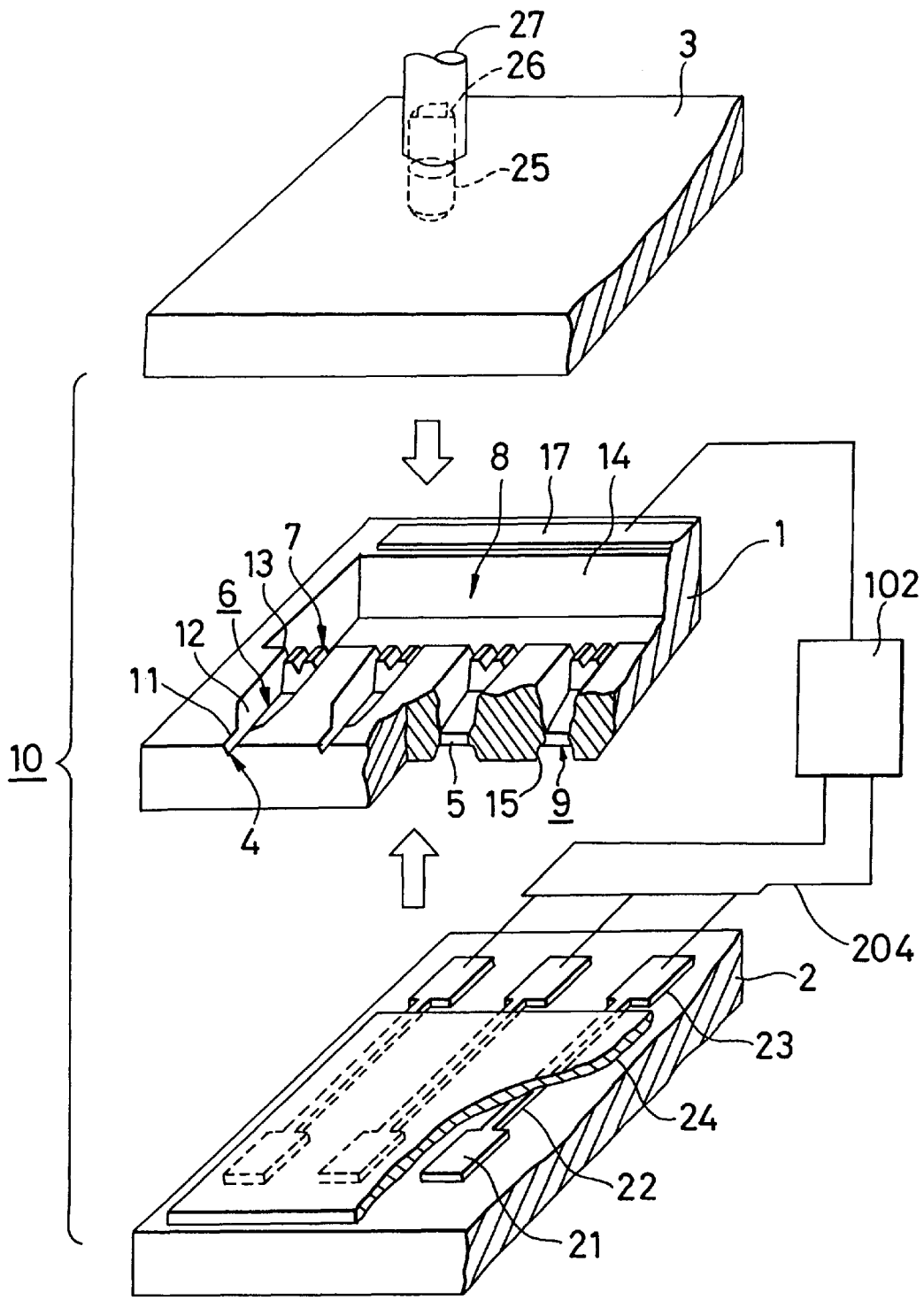
FIG. 1 is a sectional view of an embodiment of the recording head of the present invention.

In the ink jet printer of the present invention, the diameter of the orifice depends on the nozzle pitch (distance between adjacent nozzles). For instance, when the nozzle pitch is about 90 dots/inch, the diameter of the orifice is preferably from 10 to 110 μm, more preferably from 40 to 80 μm, and on the other hand, in the recording head of relatively high resolution such as about 360 dots/inch of the nozzle pitch, the diameter is preferably from 10 to 50 μm, more preferably from 20 to 40 μm.

The ink passage-forming member of the recording head used in the present invention may be further composed of borosilicate glass and single-crystal silicon.

In accordance with the foregoing constitutions, (1) The incorporation of urea or thiourea in a water-soluble ink causes a rise in the solubility of borosilicate glass. Thus, the solution of borosilicate glass can hardly be supersaturated, inhibiting the deposition of borosilicate glass. Accordingly, the nozzle can hardly be clogged. (2) Further, the incorporation of urea or thiourea, which is hygroscopic, in a water-soluble ink makes it difficult for water in the ink to evaporate. Accordingly, the deposition of borosilicate glass can be inhibited, making it further difficult for the nozzle of the recording head to be clogged. Thus, the foregoing problems of deterioration of printing quality due to incapability of jetting the ink and malpositioning of the ink shot can be solved.

Preferably, the ink for ink jet recording further comprises a surface active agent. More preferably, the surface active agent to be incorporated in the ink is composed of a compound represented by the structural formula (A):

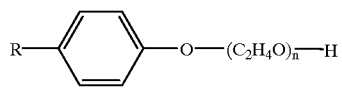

(A)

wherein R represents a halogen atom or an alkyl group and n represents a positive integer, and an acetylene diol type surface active agent.

Further, the foregoing acetylene diol type surface active agent is preferably a compound represented by the following structural formula (B):

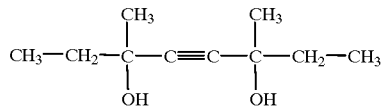

(B)

In accordance with the present invention, the use of a compound of the structural formula (A) and an acetylene diol type surface active agent provides an enhancement of the ink affinity for fiber and sizing agent constituting the paper, making it easy for the ink to penetrate into the paper.

Accordingly, the ink can uniformly penetrate into a poor quality paper. Thus, the deterioration of printed image due to feathering can hardly occur. Further, since the ink for ink jet recording of the present invention has a strong penetrating power, the ink printed even in a small amount on various papers can form a large dot, suppressing the consumption of the ink to enable efficient printing. At the same time, highly fine printing can be effected. Thus, the foregoing problems can be solved. This effect is remarkable when the acetylene diol type surface active agent is a compound of the structural formula (B).

However, it is feared that the incorporation of the surface active agent which is expected to exert such an effect enhances the wettability of the ink with respect to the ink passage in the recording head, possibly accelerating the deposition of the foregoing borosilicate glass. Nevertheless, the use of urea or thiourea in combination with the surface active agent enables the application of an ink which has a strong penetrating power with respect to various papers to a recording head having an ink passage which is partly formed by borosilicate glass.

Furthermore, the incorporation of a compound represented by the following structural formula (C), in addition to the compound represented by the foregoing formula (A) and the compound represented by the foregoing formula (B):

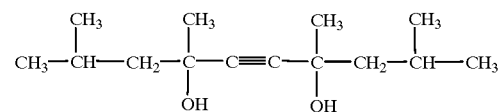

(C)

in an ink for ink jet recording makes it possible to obtain a larger printed dot.

In this case, the ink for ink jet recording preferably comprises a nitrogen-containing heterocyclic compound incorporated therein. In this arrangement, the solubility of the compound of the structural formula (C) in water can be enhanced, exerting an effect of inhibiting the drop of storage stability. This effect is remarkable when the foregoing nitrogen-containing heterocyclic compound is any of 1,3-dimethyl-2-imidazolidinone, M-methyl-2-pyrrolidone and 2-pyrrolidone.

In the compound of formula (A), examples of the halogen atom represented by R include fluorine atom, chlorine atom, bromine atom, iodine atom and astatine atom. Among them, fluorine atom, chlorine atom, bromine atom and iodine atom are preferred and chlorine atom is more preferred.

Examples of the alkyl group represented by R in formula (A) include those having 4 to 20 carbon atoms, such as hexyl group, heptyl group, octyl group, nonyl group, decyl group, undecyl group, dodecyl group, tridecyl group, and tetradecyl group. Among them, octyl group and nonyl group are preferred.

In formula (A), n represents the addition mole number of the oxyethylene group. Although it may range from 2 to 100, it is preferably within the range of from 10 to 20 in view of the storage stability and the penetrating power into paper of the water-soluble ink.

Specific and preferred examples of the compound of formula (A) include polyoxyethylene octylphenylether and polyoxyethylene nonylphenylether.

The compound of formula (A) may be present in the water-soluble ink for ink jet recording of the present invention in an amount of 10% by weight or less based on the weight of the water-soluble ink. However, in view of the penetrating power into paper and the solubility in water of the ink, the amount is preferably within a range of from 0.01 to 1% by weight, more preferably from 0.1 to 0.5% by weight.

The compound of formula (B) may be present in the water-soluble ink for ink jet recording of the present invention in an amount of 10% by weight or less based on the water-soluble ink. However, in view of the diameter of the printed dot and the solubility in water of the ink, the amount is preferably within a range of from 1 to 5% by weight.

The compound of formula (C) may be present in the water-soluble ink for ink jet recording of the present invention in an amount of 10% by weight or less based on the weight of the water-soluble ink. However, in view of the solubility in water of the ink, it is preferably within a range of from 0.01 to 0.3% by weight, more preferably from 0.1 to 0.3% by weight.

The present invention will be further described hereinafter with reference to one embodiment of the present invention.

Firstly, the structure of the recording head made of borosilicate glass to be used in the ink jet printer of the present invention will be described.

FIG. 1 is an exploded perspective view of recording head 10 used in one embodiment of the ink jet printer according to the present invention.

The recording head 10 is a laminate structure obtained by laminating three substrates 1, 2 and 3 having structures described in detail below.

The first substrate 1 as an interlayer substrate is made of silicon wafer. The substrate 1 previously comprises a plurality of nozzle grooves 11 formed on the surface thereof at an equal interval in parallel to each other extending from one end thereof in such an arrangement that a plurality of nozzle orifices 4 are formed, indentations 12 connecting to the nozzle grooves 11, respectively, and forming a jetting chamber 6 with a vibrating plate 5 as a bottom wall, narrow grooves 13 for taking in the ink, and an indentation 14 forming a common ink cavity 8 for supplying the ink into the various jetting chambers 6. Formed on the other side of the vibrating plate 5 is an insulating layer (not shown) obtained by thermally oxidizing silicon. Formed under the vibrating plate 5 is an indentation 15 coated with an electrode forming a vibrating chamber 9.

Further, the first substrate 1 is provided with a common electrode 17. As the material of the common electrode 17 there is used chromium-undercoated gold, but the present invention is not limited thereto. Different combinations may be used depending on the characteristics of silicon wafer and electrode material. The resistivity of the silicon wafer to be used in the present invention is from 8 to 12 Ω·cm.

As the second substrate 2 to be bonded to the lower surface of the first substrate 1 there is used borosilicate glass. The second substrate 2 is bonded to the first substrate 1 to form the vibrating chamber 9. Gold is sputtered onto the second substrate 2 to a thickness of 0.1 μm on the position corresponding to the respective vibrating plate 5 to form a gold pattern having almost the same shape as the vibrating plate 5 as an individual electrode 21. The individual electrode 21 has a lead portion 22 and a terminal portion 23. Further, pyrex is sputtered onto the entire surface of the substrate 2 except the electrode terminal portion to a thickness of 0.2 μm to form an insulating layer 24 as a film for inhibiting the dielectric breakdown and shortcircuitting during driving of the recording head.

As the third substrate 3 to be bonded to the upper surface of the first substrate 1 there is used borosilicate glass similarly to the second substrate 2. The third substrate 3 is bonded to the first substrate 1 to form nozzle orifices 4, jetting chambers 6, orifices 7, and an ink cavity 8. The third substrate 3 is provided with an ink feed opening 25 connecting to the ink cavity 8. The ink feed opening 25 is connected to an ink bag (not shown in FIG. 1) via a pipe 26 and a tube 27.

Subsequently, the first substrate 1 and the second substrate 2 are superposed on each other in a proper position. A voltage of 500 to 800 V is then applied across the laminate at an ambient temperature of from 300° C. to 500° C. so that the two substrates are subjected to so-called anodic bonding. Under the same conditions, the first substrate 1 and the third substrate 3 are bonded to each other. Thus, a recording head is assembled. After the anodic bonding, the resulting gap between the vibrating plate 5 and the individual electrode 21 on the second substrate 2 is equal to the difference between the depth of the indentation 15 and the thickness of the individual electrode 21. In the present embodiment, it is defined to be 0.5 μm. Further, the gap between the vibrating plate 5 and the insulating layer 24 on the individual electrode 21 is defined to be 0.3 μm.

The recording head 10 thus assembled is then covered by an outer packaging member in such an arrangement that it is fixed to form an ink jet cartridge. In this arrangement, an ink is supplied from the ink bag (not shown in FIG. 1) into the interior of the first substrate 1, the ink cavity 8, the jetting chambers 6 and the nozzle orifices 4 via the ink feed opening 25. Further, to the common electrode 17 and the terminal portion 23 of the individual electrode 21 are connected the terminal portions of FPC which are in turn connected to a head control portion 102 via wiring 204.

The method for driving the recording head used in the ink jet printer of the present invention will be now described.

When a driving voltage for driving the head is applied across the vibrating plate 5 and the individual electrode 21 of the recording head, the vibrating plate 5 and the individual electrode 21 are electrically charged, producing an electrostatic force between the vibrating plate 5 and the individual electrode 21 that causes the vibrating plate 5 to bend to drive the gas in the gas layer towards the individual electrode 21. If the driving voltage is high, the vibrating plate 5 bends until the gas layer disappears. When the application of the driving voltage is suspended to put the various electrodes in the same potential, the electric charge produced is instantly released through the various electrodes. As a result, the vibrating plate 5 restores by its restoring force due to elasticity to evacuate the ink from the ink passage. The ink thus evacuated is then jetted through the nozzle orifice 4 as an ink droplet which then hits the recording medium to form a pixel. This operation is repeatedly controlled to effect printing.

Figure 2:
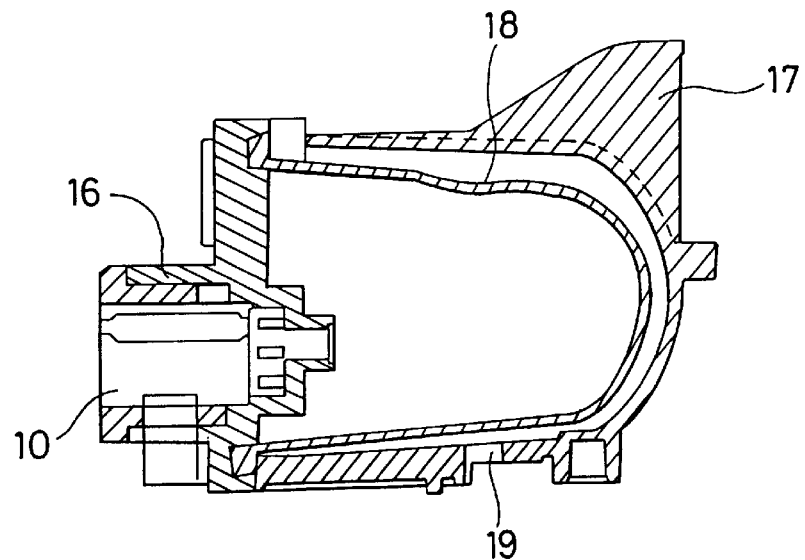
FIG. 2 is a sectional view of an embodiment of the ink jet cartridge of the present invention.

FIG. 2 is a sectional side view illustrating an ink jet cartridge employing a recording head according to the present invention.

Figure 3:
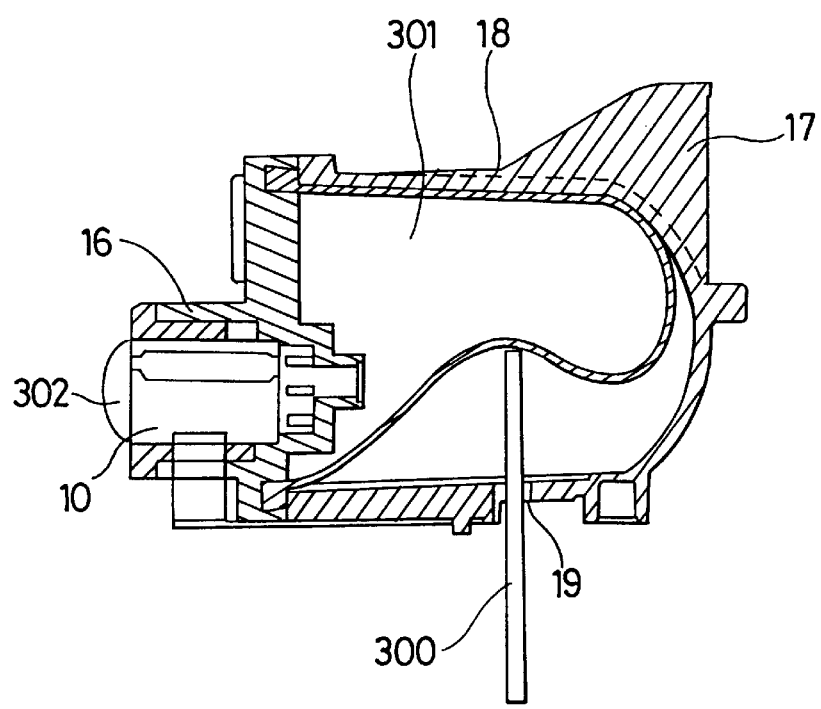
FIG. 3 is a sectional side view illustrating how priming is conducted in the embodiment of the ink jet cartridge of the present invention.

A recording head 10 is fixed to a head case 16 by a method such as bonding. An ink bag 18 for retaining an ink is provided interposed between one end of the head case 16 and one end of an ink case 17. The ink case 17 is pressed into the head case 16 so that they are bonded to each other. In this arrangement, the ink bag 18 is sealed. The ink case 17 is provided with a pressure port 19 at the bottom thereof. The pressure port 19 is arranged such that when air bubbles enter into the passage in the recording head due to impact on the ink jet cartridge or for other reasons, the ink bag 18 can be pressed by a pressure pin 300 described later to drive the air bubbles out from the passage. Further, if the recording head is allowed to stand undriven over an extended period of time, water or other solvents of the ink are evaporated from the tip of the recording head through the nozzle, causing the rise in the viscosity of the ink at that position. Thus, normal ink jetting cannot be effected. In this case, too, the rubber bag can be pressed by the pressure pin 300 to drive the high viscosity ink out from the nozzle similarly to the case where air bubbles enter into the passage in the recording head. The operation of driving the ink or air bubbles out from the nozzle by pressing the rubber bag is called priming. How it is operated is shown in FIG. 3. In FIG. 3, the reference numeral 301 indicates an ink retained in the ink bag. The reference numeral 302 indicates the ink evacuated by priming. The reference numeral 300 indicates a pressure pin. The same numerals are used for the same components in FIGS. 2 and 3. Thus, the description of these reference numerals is omitted in FIG. 3.

The water-soluble ink for use in the ink jet printer of the present invention will be described hereinafter.

As an example, the water-soluble ink which may be used in the present invention comprises C. I. Direct Black-19 as a water-soluble dye; glycerin as a wetting agent; a compound (A) which is a polyoxyethylene phenyl ether represented by the foregoing structural formula (A), a compound (B) which is an acetylene type diol surface active agent represented by the foregoing structural formula (B) and a compound (C) which is an acetylene type diol surface active agent represented by the foregoing structural formula (C) as surface active agents; 2-pyrrolidone as a nitrogen-containing heterocyclic compound; urea or thiourea; and water (deionized water or pure water).

Referring to the water-soluble dye, as a black dye there may be used C. I. Direct Black (hereinafter referred to as "DBk")-38, DBk-71, DBk-74, DBk-75, DBk-90, DBk-112, DBk-117, DBk-154, DBk-169, Acid Black (hereinafter referred to as "ABk")-2, ABk-24, ABk-31, ABk-52 or the like. As a color dye there may be optionally used one selected from the group consisting of C. I. Direct Yellow (hereinafter referred to as "DY")-27, DY-28, DY-33, DY-39, DY-58, DY-86, DY-88, DY-98, DY-132, DY-142, and DY-144, Acid Yellow (hereinafter referred to as "AY")-11, AY-17, AY-23, and AY-25, Direct Red (hereinafter referred to as "DR")-1, DR-2, DR-4, DR-9, DR-11, DR-13, DR-17, DR-20, and DR-227, Acid Red (hereinafter referred to as "AR")-1, AR-14, AR-32, AR-51, AR-52, AR-87, AR-92, AR-94, and AR-249, Direct Blue (hereinafter referred to as "DB")-1, DB-8, DB-71, DB-76, DB-78, DB-80, DB-86, DB-90, and DB-199, and Acid Blue (hereinafter referred to as "AB")-9, AB-22, AB-93, and AB-112.

Specific examples of the water-soluble dyes are disclosed, for example, in JP-A-2-255774 and U.S. Pat. No. 5,180,425, hereby incorporated by reference.

In general, the water-soluble dye may be present in the water-soluble ink for ink jet recording of the present invention in an amount of from 0.1 to 10% by weight, preferably from 1 to 5% by weight, more preferably from 2 to 4% by weight, based on the weight of the water-soluble ink.

Referring to the wetting agent, if it comprises a mixture of various water-soluble organic solvents as a main liquid medium component, glycerin may be properly altered. For example, as the water-soluble organic solvent there may be used a polyvalent alcohol solvent which has a low vapor pressure and can hardly evaporate to dryness, such as polyalkylene glycol (e.g., polyethylene glycol, polypropylene glycol) and alkylene glycol (e.g., ethylene glycol, triethylene glycol).

Specific examples of the wetting agent are disclosed, for example, in JP-A-2-255774 and U.S. Pat. No. 5,180,425, hereby incorporated by reference.

In general, the wetting agent may be present in the water-soluble ink for ink jet recording of the present invention in an amount of from 1 to 70% by weight, preferably from 2 to 40% by weight, more preferably from 10 to 25% by weight, based on the weight of the water-soluble ink.

The nitrogen-containing heterocyclic compound is not limited to 2-pyrrolidone. 1,3-Dimethyl-2-imidazolidinone or N-methylpyrrolidone may be added.

Further, in order to optimize the physical properties of the ink or enhance the properties of the ink, various ordinary known additives may be used besides the foregoing components. For example, a viscosity modifier, a mildewproofing agent, etc. may be used.

The water-soluble ink for ink jet recording of the present invention may be prepared by mixing the above-mentioned ingredients in a conventional manner.

Figure 4:
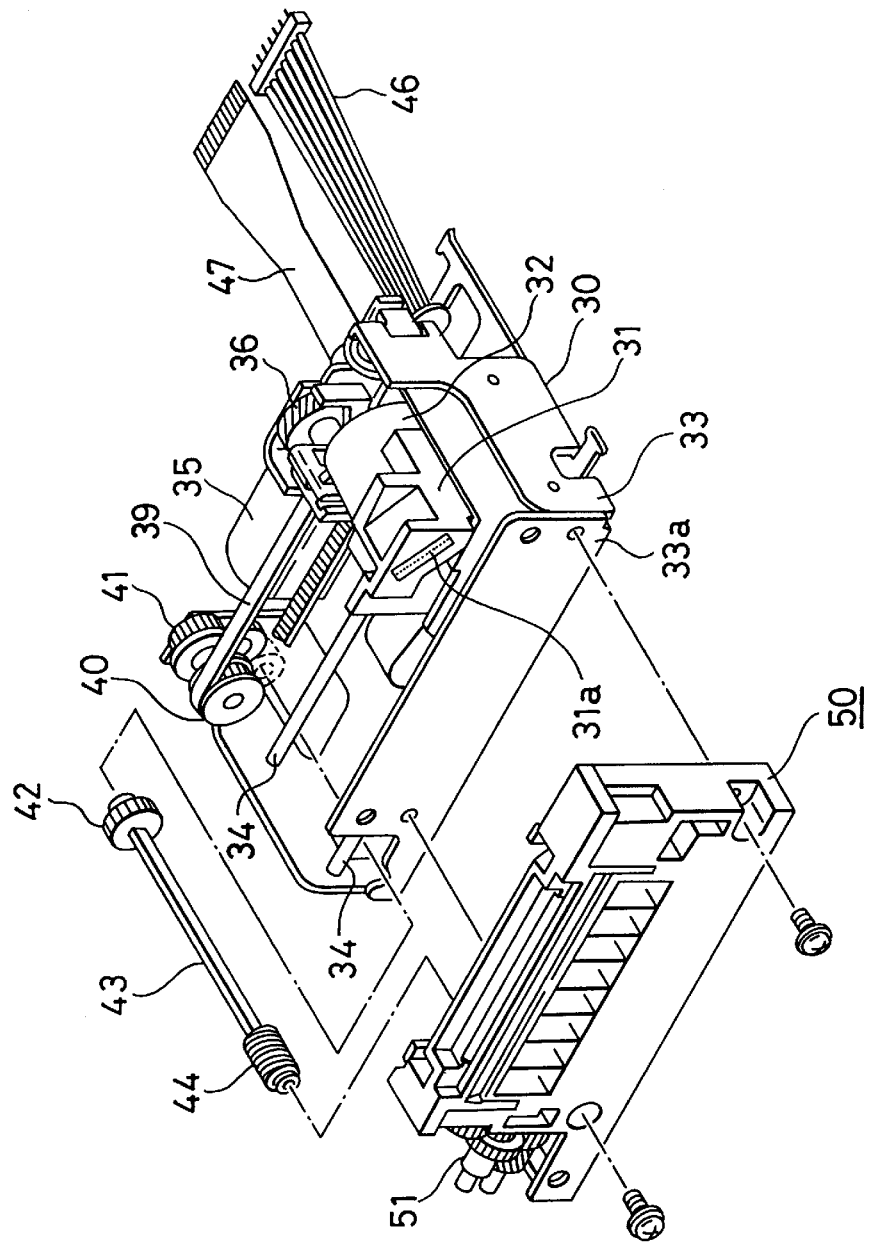
FIG. 4 is an exploded perspective view of an embodiment of the ink jet printer of the present invention.
Figure 5:
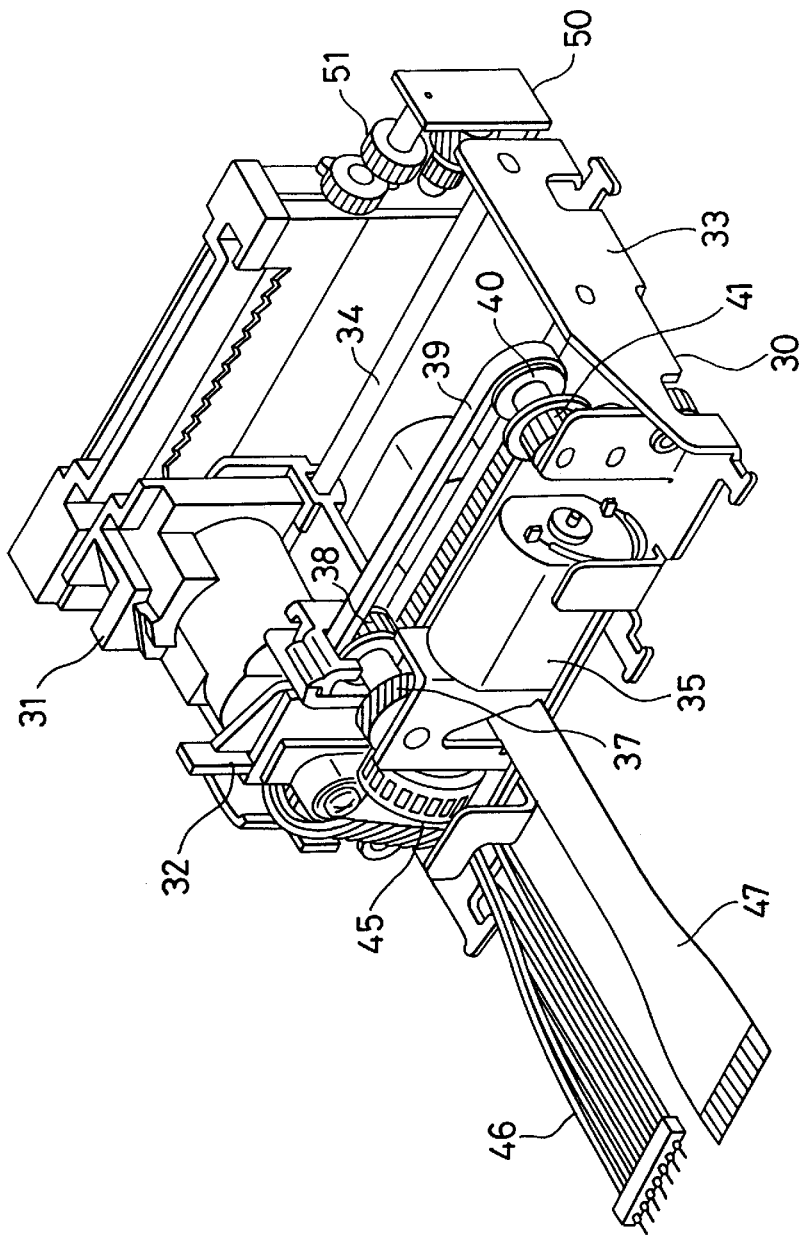
FIG. 5 is a perspective view of the ink jet printer of FIG. 4 as viewed from the motor side.

An exploded view of the ink jet printer according to an embodiment of the present invention comprising the foregoing recording head made of borosilicate glass and water-soluble ink is shown in FIG. 4. A perspective view of the ink jet printer as viewed from the motor side is shown in FIG. 5.

The ink jet printer comprises a printer main body 30 and a paper feed unit 50 as shown in the drawing. The printer main body 30 is provided with an ink jet cartridge 31 on which a recording head 31a and an ink bag (not shown in FIGS. 4 and 5) are mounted. The ink bag is filled with the foregoing water-soluble ink for ink jet recording. The ink jet cartridge 31 is attached to a carriage 32. The carriage 32 is supported by a pair of guide axes 34 provided on a frame 33 in such an arrangement that it can freely move in the axial direction. As a motor 35 which acts as a driving source for driving the carriage 32 there is provided, e.g., dc motor which gives a rotational drive in one direction. The rotational drive given by the motor 35 is transmitted to a gear 36 which in turn rotates a gear 37 and a drive wheel 38 engaged therewith to rotationally drive a timing belt 39. This rotation causes a driven wheel 40 to rotate. A driving pin (not shown) for connecting the carriage 32 to the timing belt 39 is provided. In this arrangement, when the timing belt 39 is rotationally driven in one direction, the carriage 32 moves back and forth.

A gear 42 is engaged with a gear 41 provided on the driven wheel 40. The gear 42 is provided at one end of a transmission axis 43. A gear 44 is provided at the other end of the transmission axis 43. When the gear 42 rotates, a driving force is fed to a paper feed unit 50 via the transmission axis 43 and the gear 44. Provided in the printer main body 30 is an encoder 45 for detecting the rotation of the motor 35. The encoder 45 is directly connected to the rotary axis of the motor 35. Connected to the printer main body 30 are the motor 35, control wires 46 for driving sensors (not shown), etc. and withdrawing signals therefrom, and control wires 47 through which a control signal for driving the recording head 31a is inputted.

Provided in the paper feed unit 50 is a gear train 51 which engages with the gear provided at the other end of the transmission axis 43 of the printer main body 30. The gear train 51 is connected to a pair of paper feed rollers (not shown). In this arrangement, when the ink jet cartridge 31 moves in one direction to effect printing, and then moves back to its home position, the paper feed unit 50 feeds loaded paper by one line. The paper feed unit 50 is screwed on a guide 33a formed by bending the frame 33 of the printer main body 30 upward at right angle, and is fixed to the printer main body 30.

In the ink jet printer having the foregoing constitution, a voltage for controlling the motor 35 and the sensors or other signals are fed through the control wire 46. Further, a control signal is fed to the recording head 31a mounted on the ink jet cartridge 31 through the control wire 47. When the motor 35 rotates, the timing belt 39 is driven to move the driving pin which in turn moves the carriage 32 along the guide axis 34. In this operation, the recording head 31a jets the foregoing water-soluble ink for ink jet recording onto, e.g., a register paper according to control signal to effect printing. When printing is finished by one line, a driving force for feeding paper is transmitted to the paper feed unit 50 via the transmission axis 43 to rotate the paper feed roller of the paper feed unit 50 in such a manner that the register paper is fed by one line. This operation is repeated by the number of lines to be printed.

Referring to an ink jet printer having such a relatively simple carriage driving mechanism, in order to minimize the power consumption and reduce the size of the printer itself, it is preferred that the weight of the ink in the ink jet printer (excluding the recording head and the cartridge) be restricted to not more than about 50 g.

In order to adapt the ink jet printer to various uses, it is preferred that 10 million letters can be printed with an ink weight of not more than 50 g from the standpoint of the life (frequency of replacement of expendables) of the existing ink ribbon for wire dot printer. This value is one of measures of the evaluation described later.

The foregoing ink jet printer was allowed to stand under high temperature conditions with an ink cartridge filled with an ink mounted thereon. The ink jet printer was then returned to ordinary temperature. The nozzle of the recording head was then observed under a metallic microscope. The printing quality was then evaluated. Further, the printed matter was examined for dot failure, malpositioning of ink shot and printing quality. As a result, it was found that when priming is effected, there causes no dot failure and malpositioning of ink shot and no change of printing quality from before storage under high temperature conditions.

This is attributed to the following effects:

(1) The incorporation of urea or thiourea in the water-soluble ink causes a rise in the solubility of borosilicate glass. Thus, even if the recording head made of borosilicate elutes with water, the solution can hardly be supersaturated, inhibiting the deposition of borosilicate glass.

(2) The incorporation of urea or thiourea, which is hygroscopic, in the water-soluble ink makes it difficult for water in the ink to evaporate. Thus, the deposition of borosilicate glass can be inhibited. Accordingly, the nozzle can be prevented from being clogged by borosilicate glass deposited from the solution.

The content of urea and/or thiourea in the water-soluble ink is 0.1 to 20 wt %, preferably 1 to 15 wt %, and more preferably 2 to 10 wt % as the total amount.

The diameter of dot printed at an ink jetting rate of 0.1 μg/dot and the amount of an ink required to print 10 million letters on a register paper were examined. As a result, the ink comprising both compounds (A) and (B) gave a larger printed dot diameter than the inks comprising either one of the two compounds. Further, the incorporation of a compound (C) in the ink comprising both the compounds (A) and (B) provides an enhancement of ink penetrating power, thereby giving a larger printed dot diameter.

When the content of the compound (C) is increased, the resulting ink exhibits a deteriorated storage stability. However, it was found that the incorporation of a nitrogen-containing heterocyclic compound such as 2-pyrrolidone provides an enhancement of storage stability.

The foregoing description will be further described in the following examples.

EXAMPLES 1 TO 7 AND COMPARATIVE EXAMPLES 1 TO 5

Table 1 shows the formulation of the inks of Examples 1 to 7 and Comparative Examples 1 to 5. The water-soluble inks of these examples and comparative examples each comprise C. I. Direct Black-19 as a water-soluble dye, glycerin as a wetting agent, a polyoxyethylene octyl phenyl ether represented by the foregoing structural formula (A) (in which R is an octyl group, the number of moles added being 17) as the compound (A) which is a surface active agent, an acetylene type diol surface active agent represented by the foregoing structural formula (B) as the compound (B), an acetylene type diol surface active agent represented by the foregoing structural formula (C) as the compound (C), 2-pyrrolidone as the nitrogen-containing heterocyclic compound, urea or thiourea, and water (deionized ion or pure water).

TABLE 1

|  |  | Dye (wt %) | Wetting agent (wt %) | Surface active agent (wt %) | | | Nitrogen-containing compound (wt %) 2-Pyrrolidone | Urea (wt %) | Thiourea (wt %) | Water (wt %) |
|---|---|---|---|---|---|---|---|---|---|---|
|  |  |  |  | Compound (A) | Compound (B) | Compound (C) |  |  |  |  |
| Example | 1 | 3.0 | 15.0 | 0.2 | 4.0 | 0 | 0 | 2.0 | 0 | 75.8 |
|  | 2 | 2.5 | 15.0 | 0.1 | 2.5 | 0 | 0 | 0 | 2.0 | 77.9 |
|  | 3 | 3.0 | 15.0 | 0.3 | 3.0 | 0 | 0 | 2.0 | 1.5 | 75.2 |
|  | 4 | 3.0 | 15.0 | 1.0 | 3.0 | 0.2 | 5.0 | 2.0 | 0 | 70.8 |
|  | 5 | 2.5 | 15.0 | 0.1 | 2.5 | 0.1 | 7.0 | 0 | 5.0 | 67.8 |
|  | 6 | 3.5 | 15.0 | 0.5 | 3.5 | 0.1 | 5.0 | 5.0 | 5.0 | 62.4 |
|  | 7 | 3.0 | 15.0 | 0.2 | 4.0 | 0.2 | 10.0 | 1.0 | 2.0 | 64.6 |
| Comparative Example | 1 | 3.0 | 15.0 | 0.2 | 4.0 | 0 | 0 | 0 | 0 | 77.8 |
|  | 2 | 2.5 | 15.0 | 0.1 | 2.5 | 0 | 0 | 0 | 0 | 79.9 |
|  | 3 | 3.0 | 15.0 | 0 | 3.0 | 0 | 10.0 | 1.0 | 2.0 | 66.0 |
|  | 4 | 3.0 | 15.0 | 1.0 | 0 | 0 | 10.0 | 3.0 | 0 | 68.0 |
|  | 5 | 3.5 | 15.0 | 0.5 | 3.5 | 0.1 | 0 | 0 | 5.0 | 71.9 |

The various components were weighed on a balance according to the formulation set forth in Table 1. These components were heated on the boil with thorough stirring for 3 hours, allowed to cool to room temperature, and then filtered through a membrane filter having a pore diameter of 0.8 µm to prepare the water-soluble inks of Examples 1 to 7 and Comparative Examples 1 to 5.

Each of the examples was filled into the ink bag 18 of the ink jet cartridge shown in FIG. 2. Each of the ink jet cartridge was mounted on the ink jet printer shown in FIG. 4, and each of the examples was then evaluated for the following properties. Referring to the recording head for the evaluation, the head includes a borosilicate glass substrate 3 as shown in FIG. 1, the amount of ink to be jetted through one nozzle 4 per one shot is 0.1 µg, and the nozzle pitch (distance between adjacent nozzles) corresponds to a resolution of 90 dots/inch.

Firstly, the ink jet printer was allowed to stand under high temperature conditions. In some detail, it was allowed to stand in a 40° C. constant temperature bath for 30 days, in a 50° C. constant temperature bath for 20 days and in a 60° C. constant temperature bath for 5 days. The ink jet printer which had been thus aged was then returned to ordinary temperature. The nozzle was then observed under a metallurgical microscope to evaluate printing quality. For the evaluation of printing quality, the recording head was driven at a driving voltage of 38 V, a pulse width of 32 µsec and a drive frequency of 3.0 kHz.

The resulting printed matter was then evaluated for dot failure, malpositioning of ink shot and printing quality.

Further, the diameter of dot printed at an ink discharge rate of 0.1 µg/dot and the amount of the ink required to print 10 million letters on a register paper were examined.

Further, the inks of Examples 1 to 7 and Comparative Examples 1 to 5 were each charged in a glass bottle. The glass bottle was then allowed to stand in a −20° C. or 70° C. constant temperature bath for 7 days. Then, the ink was examined for storage stability immediately or after one day of ageing at room temperature.

These evaluation tests will be further described hereinafter.

(1) Observation of Nozzle After Ageing at High Temperature

The nozzle of the recording head of the ink jet printer of the present invention which had been allowed to stand under high temperature conditions was observed under a metallurgical microscope. The results were then judged according to the following criterion.

Under any conditions after ageing under the foregoing various conditions,

No deposition of solid content was observed in the nozzle: A

Some deposition of solid content was observed in the nozzle: C (2) Dot Failure

The printed matter was examined to see if there was any dot failure. If there was some dot failure, it was evaluated if dot failure still occurs even after the ink has been forcedly evacuated by priming. The results were then judged according to the following criterion.

No dot failure occurs after forced evacuation: A

Dot failure is not eliminated even by forced evacuation: C (3) Malpositioning of Ink Shot Among the printed matters used in the foregoing evaluation test, those showing no dot failure were evaluated for malpositioning of ink shot. The results were then judged according to the following criterion.

No malpositioning of ink shot was observed: A

Some malposition of ink shot was observed: C (4) Printing Quality After Ageing at High Temperature In the foregoing evaluation test, comparison of the printing quality of the printed matters was made between before and after ageing. The term "printing quality" as used herein is meant to indicate the results of comprehensive evaluation of printing density, dot shape and dot size. The results were visually judged according to the foregoing criterion.

No change in printing quality was observed: A

Some change in printing quality was observed: C (5) Diameter of Printed Dot

Printing was made on a commercial ordinary paper (e.g., PPC paper according to Fuji Xerox Co., Ltd.) and a register paper (e.g., 45 kg register paper available from Oji Seishi K. K.). These papers were then measured for diameter of printed dot by a metallurgical microscope. The diameter of a dot was simply determined by averaging the crosswise length and the longitudinal length of the dot.

(6) Amount of Ink Required to Print 10 Million Letters

The diameter of printed dot was changed by changing the ink discharge rate during printing. The relationship between the ink discharge rate and the diameter of printed dot was represented in graph. From printed samples having various printed dot diameters, it was found that the print dot diameter optimum for obtaining a printed image having an excellent in a high resolution (720 dots/in.) printing is from 0.03 mm$\phi$ to 0.05 mm$\phi$. From the graph, the ink discharge rate required to obtain the optimum printed dot diameter was found. Supposing that the ink discharge rate per dot is a [µg] and the number of dots required per letter is b [dot], the amount of the ink required to print 10 million letters is 10×a×b [g].

(7) Storage Stability

The inks of Examples 1 to 7 and Comparative Examples 1 to 5 were each charged in a glass sample tube. The sample tube was then allowed to stand in a −20° C. or 70° C. constant temperature bath for 7 days. Immediately or after one day of ageing at room temperature, the sample was checked to see if the components underwent separation. The results were judged according to the following criterion.

Immediately or after one day of ageing at room temperature following ageing in a −20° C. or 70° C. constant temperature bath for 7 days, No component separation was observed: A Some component separation was observed: C The results of the evaluation are set forth in Table 2.

|  |  | Observation of nozzle after ageing at high temp. | Dot failure | Malpositioning of ink shot | Printing quality after ageing at high temp. | Storage stability −20° C. | Storage stability 70° C. | Printed dot diameter (mm) Ordinary paper | Printed dot diameter (mm) Register paper | Amount of ink required to print 10 million letters |
|---|---|---|---|---|---|---|---|---|---|---|
| Example | 1 | A | A | A | A | A | A | 0.21 | 0.20 | 38.4 |
|  | 2 | A | A | A | A | A | A | 0.21 | 0.21 | 38.4 |
|  | 3 | A | A | A | A | A | A | 0.20 | 0.18 | 48.0 |
|  | 4 | A | A | A | A | A | A | 0.23 | 0.22 | 38.4 |
|  | 5 | A | A | A | A | A | A | 0.22 | 0.21 | 38.4 |
|  | 6 | A | A | A | A | A | A | 0.22 | 0.21 | 38.4 |
|  | 7 | A | A | A | A | A | A | 0.24 | 0.22 | 38.4 |
| Comparative Example | 1 | C | C | C | C | A | A | 0.21 | 0.20 | 38.4 |
|  | 2 | C | C | C | C | A | A | 0.21 | 0.21 | 38.4 |
|  | 3 | A | A | A | A | A | A | 0.19 | 0.14 | 86.4 |
|  | 4 | A | A | A | A | A | A | 0.18 | 0.11 | 144.0 |
|  | 5 | A | A | A | A | C | C | 0.22 | 0.21 | 38.4 |

In Examples 1 to 7 and Comparative Examples 1 and 2, as can be seen in Table 2, the water-soluble inks of Comparative Examples 1 and 2 showed deposition of solid content when the nozzle of the recording head was observed under a metallurgical microscope after ageing at high temperature. The deposit was then subjected to elemental analysis. As a result, the deposit was found to be glass. On the other hand, the nozzle of the recording head using the water-soluble inks of Examples 1 to 7 showed no deposition of eluted glass.

Further, when the ink jet printer of the present invention which had been returned to ordinary temperature after ageing at high temperature was used for printing, the ink jet printer using the water-soluble inks of Examples 1 to 7 caused little or no dot failure. Even if there was any dot failure, there occurred no dot failure after priming. On the other hand, the ink jet printer using the inks of Comparative Examples 1 and 2 showed much dot failure. Dot failure still occurred even after priming.

Referring to malpositioning of ink shot, the ink jet printer using the water-soluble inks of Examples 1 to 7 showed no malpositioning of ink shot if there occurred no dot failure after priming. On the other hand, the ink jet printer using the water-soluble inks of Comparative Examples 1 and 2 showed some malpositioning of ink shot even if there occurred no dot failure.

Referring to printing quality after ageing at high temperature, the ink jet printer using the water-soluble inks of Examples 1 to 7 showed no change of printing quality from before and after ageing at high temperature. On the other hand, the ink jet printer using the water-soluble inks of Comparative Examples 1 and 2 showed a remarkable change of printing quality from before and after ageing at high temperature.

Referring to Examples 1 to 3 and Comparative Examples 3 and 4, the water-soluble ink of Comparative Example 3 comprises a compound (B) alone incorporated therein and the water-soluble ink of Comparative Example 4 comprises a compound (A) alone incorporated therein. These inks give a small dot diameter as shown in Table 2. It can be seen that this tendency is remarkable particularly on a register paper. The water-soluble inks of Examples 1 to 3 each comprise both compounds (A) and (B) incorporated therein. These inks gave a relatively large printed dot diameter even on a register paper.

It can be seen in the foregoing facts that a surface active agent containing any one of compounds (A) and (B) cannot give a large printed diameter particularly on a register paper, and a surface active agent containing both compounds (A) and (B) is required to enhance the ink penetrating power.

In Examples 4 to 7, it can be seen that the addition of a compound (C) to an ink containing both compounds (A) and (B) gives a larger printed dot diameter. However, if the compound (C) is further added to exert an effect of increasing the printed dot diameter, the storage stability of the ink can be deteriorated. The comparison between Examples 4 to 7 and Comparative Example 5 shows that the incorporation of a nitrogen-containing heterocyclic compound such as 2-pyrrolidone as an auxiliary solvent in the ink can inhibit the deterioration of the storage stability of the ink. Thus, by adding a compound (C) to increase the printed dot diameter and further adding an auxiliary solvent to increase the content of compounds (A), (B) and (C), the desired effect can be further enhanced.

As mentioned above, if the ink jet cartridge is given an impact, air bubbles can enter in the passage in the recording head. The recording head in the embodiment of the present invention as mentioned above jets ink droplets by changing the pressure in the jetting chamber 6. However, if air bubbles enter in the jetting chamber 6 in the recording head, the pressure change caused by changing the pressure in the jetting chamber 6 is absorbed by the air bubbles and the air bubbles are not discharged, disabling the ink droplets to be jetted and hence causing dot failure. This makes it necessary to forcedly evacuate air bubbles from the jetting chamber 6 by priming. If the ink has poor wettability with respect to the recording head, air bubbles can be caught by the interior of the jetting chamber 6 when they are forcedly evacuated. Thus, the air bubbles cannot be evacuated. In order to improve the evacuatability of air bubbles, the ink for ink jet recording of the present invention comprises a surface active agent incorporated therein. However, since an ink comprising a surface active agent incorporated therein has good wettability, the borosilicate glass has a great contact area with the ink and thus can easily elute with the ink, causing the clogging of the recording head and hence dot failure. Nevertheless, if such a water-soluble ink comprising a surface active agent incorporated therein further comprises urea or thiourea incorporated therein, the nozzle of the recording head can hardly be clogged as can be seen in the results of Examples 1 to 7 and Comparative Examples 1 and 2 as set forth in Table 1.

As mentioned above, in the present invention, the incorporation of a surface active agent makes it possible to provide an ink jet printer and an ink for ink jet recording having a high reliability which can provide a printed image having an excellent quality, exhibit an enhanced evacuatability of air bubbles and prevent glass from clogging the nozzle, thereby inhibiting dot failure.

Further, the recording head to used in the ink jet printer of the present invention is produced using a semiconductor technique as mentioned above. Thus, unlike conventional recording heads produced by molding, the recording head of the present invention can be provided with a small nozzle diameter to a good precision at a low cost.

Further, by using a recording head capable of printing at a small ink discharge rate and a water-soluble ink capable of providing a desired dot diameter at a small ink discharge rate in combination, the ink jet printer of the present invention can print at a high resolution, making it possible to obtain a printed image having an excellent printing quality.

Further, since a printed image having an excellent quality can be provided on various papers at a small ink discharge rate, 10 million letters can be printed on a poor paper such as register paper at an ink discharge rate as small as not more than 50 g, making it possible to reduce the running cost as well as reduce the size and weight of the ink jet cartridge and hence miniaturize the overall structure of the printer.

As mentioned above, the ink jet printer and ink for ink jet recording of the present invention have the following excellent effects:

(1) The incorporation of urea or thiourea in a water-soluble ink can inhibit the elution and deposition of borosilicate glass that causes the clogging of the nozzle by glass. Further, the incorporation of a surface active agent in the water-soluble ink can provide an enhancement of evacuatability of air bubbles, making it possible to inhibit dot failure. Further, the deterioration of printing quality can be inhibited. Thus, the reliability of the ink jet printer can be drastically enhanced.

(2) The combined use of a recording head having a high precision nozzle diameter and a water-soluble ink comprising a surface active agent incorporated therein can provide an ink jet printer which can print fine images with a high quality free from feathering even on a poor paper.

(3) A low cost recording head and a low cost running together can provide an inexpensive ink jet printer.

(4) An ink jet cartridge having a smaller size and a lighter weight can be provided, making it possible to miniaturize the overall structure of the ink jet printer.

While the invention has been described in detail and with reference to specific embodiments thereof, it will be apparent to one skilled in the art that various changes and modifications can be made therein without departing from the spirit and scope thereof.

What is claimed is:

1. An ink for ink jet recording comprising at least one of urea and thiourea, a compound represented by the following structural Formula (A):

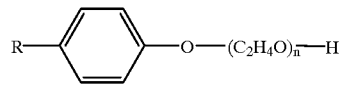

(A)

and an acetylene diol surface active agent represented by the following structural Formula (B):

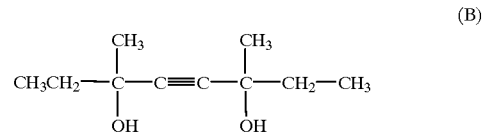

(B)

wherein R represents a halogen atom or an alkyl group; and n represents a positive integer.

2. The ink jet for ink jet recording according to claim 1, wherein said ink jet recording is carried out using an ink jet printer which jets a water-soluble ink from a recording head comprising an ink passage-forming member which is at least partly formed by borosilicate glass single-crystal silicon and an orifice to form flying droplets which form a dot image on recording medium.

3. The ink for ink jet recording according to claim 1, further comprising an acetylene diol surface active agent represented by the following structural formula (C):

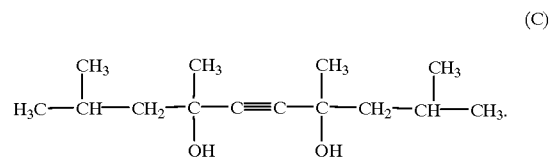

(C)

4. The ink for ink jet recording according to claim 1, further comprising a nitrogen-containing heterocyclic compound.

5. The ink for ink jet recording according to claim 4, wherein said nitrogen-containing heterocyclic compound is selected from the group consisting of 1,3-dimenthyl-2-imidazolidinone, N-methyl-2-pyrrolidone and 2-pyrrolidone.

* * * * *